US006593710B2

(12) United States Patent
Reck

(10) Patent No.: US 6,593,710 B2
(45) Date of Patent: Jul. 15, 2003

(54) MOVING APPARATUS WITH TWO CONNECTED MOVABLE ACTUATING ELEMENTS FOR A PAIR OF PERSON EXTREMITIES

(76) Inventor: Martin Reck, Reckstrasse 1-3, D-88422 Betzenweiler (DE)

( * ) Notice: Subject to any disclaimer, the term of this patent is extended or adjusted under 35 U.S.C. 154(b) by 0 days.

(21) Appl. No.: 09/804,044

(22) Filed: Mar. 13, 2001

(65) Prior Publication Data

US 2002/0041169 A1 Apr. 11, 2002

(30) Foreign Application Priority Data

Mar. 13, 2000 (DE) ........................................ 100 11 532

(51) Int. Cl.[7] .................................................. H02K 7/00

(52) U.S. Cl. ..................... 318/1; 482/7; 482/8; 482/57; 280/259; 280/260; 601/35

(58) Field of Search ............................ 318/1; 482/7, 8, 482/57; 280/259, 260; 601/35

(56) References Cited

U.S. PATENT DOCUMENTS

| | | | | | |
|---|---|---|---|---|---|
| 3,964,742 | A | * | 6/1976 | Carnielli | 482/7 |
| 4,084,810 | A | * | 4/1978 | Forsman | 188/159 |
| 4,976,426 | A | * | 12/1990 | Szabo et al. | 482/6 |
| 5,071,117 | A | * | 12/1991 | Mautner et al. | 482/57 |
| 5,137,501 | A | * | 8/1992 | Mertesdorf | 482/57 |
| 5,573,481 | A | * | 11/1996 | Piercy et al. | 482/57 |
| 5,860,941 | A | * | 1/1999 | Saringer et al. | 601/33 |
| 5,890,996 | A | * | 4/1999 | Frame et al. | 482/8 |
| 6,244,987 | B1 | * | 6/2001 | Ohsuga et al. | 434/247 |

FOREIGN PATENT DOCUMENTS

| | | |
|---|---|---|
| DE | 40 14 331 | 7/1991 |
| DE | 42 28 091 | 3/1994 |
| DE | 44 31 825 | 5/1995 |
| DE | 195 29 764 | 2/1997 |
| DE | 195 29 377 | 3/1997 |
| DE | 199 53 407 | 5/2000 |

* cited by examiner

*Primary Examiner*—Rita Leykin
(74) *Attorney, Agent, or Firm*—Crowell & Moring LLP

(57) ABSTRACT

It is an object of the invention to provide a movement device, which makes possible an improved conclusion concerning the cooperation of a person with impaired mobility during training. In a first solution, "active phases", related to a side, represent a quantity, which corresponds to the time, to the path or to the angle of the active phases traversed. In a second solution, this procedure is related to the actuating elements, considered as a unit. In further parallel solutions, an evaluation takes place with regard to a first quantity, which represents the active phases, and a second quantity, which expresses the passive phases, and moreover for side-related and integral training, that is, training, in which the actuating elements are considered in totality.

30 Claims, 1 Drawing Sheet

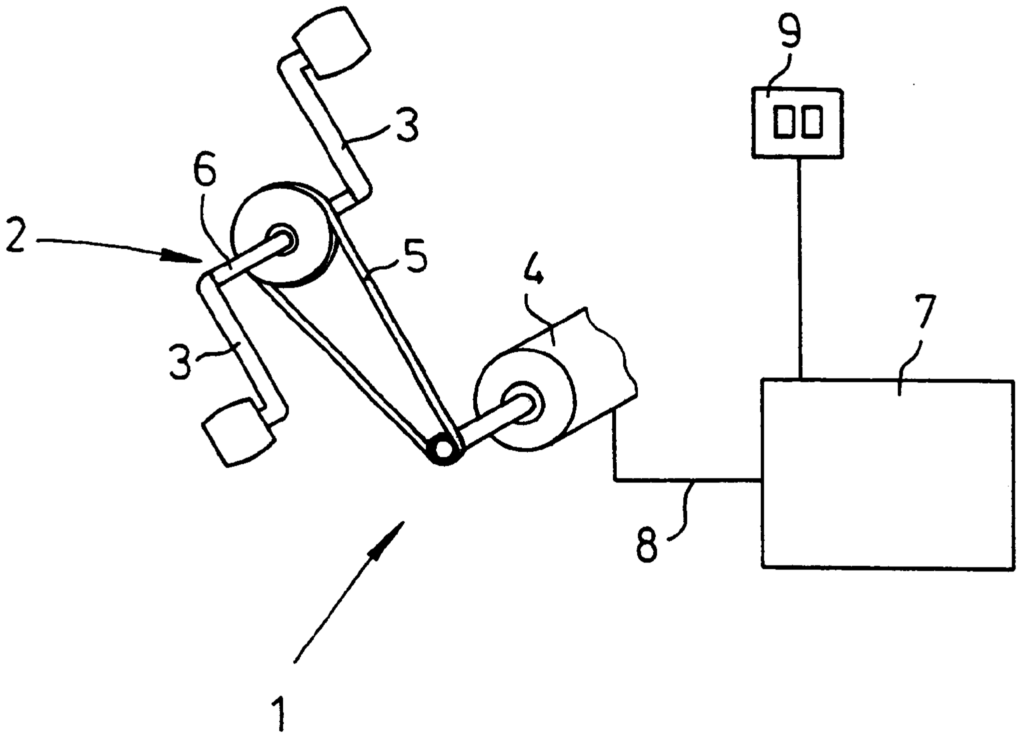
9
3
6
2
5
4
7
3
8
1

MOVING APPARATUS WITH TWO CONNECTED MOVABLE ACTUATING ELEMENTS FOR A PAIR OF PERSON EXTREMITIES

BACKGROUND AND SUMMARY OF THE INVENTION

The invention relates to a movement device with two mutually connected, movable actuating elements for an extremity pair of a person, means for driving and braking the actuating elements, as well as an electronic unit for regulating and/or controlling the movement of the actuating elements.

Movement devices of the type described above have become known in different embodiments and are used predominantly for the treatment of people, whose mobility is impaired.

Since people with impaired mobility, such as those who are paralyzed on one side, frequently are not able to bring about a circular motion at a movement device with a crank handle, such movement devices frequently have a mode, in which, for example, the legs of a person of impaired mobility, are moved at a constant rpm. However, the impaired person can support the movement by the work of his own muscles.

In the German Patent document DE 198 11 233 A1, an embodiment of a movement device is disclosed which, by adapting an "electronic centrifugal mass", produces a relatively large increase in the rpm when actively actuated very little by the person of impaired mobility. However, this increase in rpm then declines slowly. Such a regulation is intended to provide the person of impaired mobility with a success experience, which improves the efficiency of the training.

It is an object of the invention to provide a movement device of the type described above, which permits an improved conclusion to be drawn with respect to the cooperation of a person of impaired mobility during the training.

Starting out from a movement device of the type described above, such an objective can be accomplished by the characterizing distinguishing features of the claims.

In the first way of accomplishing the objective, the electronic unit is designed so that, when an extremity acts on an actuating element, movement phases of the actuating element are defined as the "active phase" in accordance with certain fixed criteria, and are assigned to a quantity. This quantity may be a sum. In other words, all the movement phases of the actuating element may be summed up. This sum, with the exception of one factor, may be the total time when the actuating element is in the active phases, sum of the length of the path traveled in the active phases, or the sum of the angular displacements of the active phases. This means that the quantity reflects the quantity of the active movement phases. Preferably, the sum of the times, of the paths or of the angles traversed are determined directly for quantifying the active phases. These physical quantities usually have the advantage, that they can easily be related to a total value. For example, the path traveled can be summed within active movement phases and then easily added to obtain the total path traveled. For example, the following option is conceivable: path traveled, active: 12 km; total path traveled: 20 km.

Of course, it would also be possible to state the "active time" in relation to the total training time. The quantity for the active phases can be determined in relation to the side, as in the case of the first possibility just described or, as in the case of a further significant variation, considered as a unit for the actuation elements. With the formulation, "the total active effect of an extremity pair on the actuating elements", the training phase is to be determined, in which the training person exerts a total force on the actuating elements through the extremities of an extremity pair, the force acting in the direction of an intended movement of the actuating elements. In other words, in particular, for example, the following cases at a pedal crank, at which a direction of rotation is specified, shall be assigned to the active movement phase: movement phases, at which the training person exerts a force with at least, for example, one foot on the crank arm, the force supporting the crank movement in the specified direction or movement phases, for which the leg pair in all produces a force acting on the crank, which tends to drive the crank in the specified direction.

In this way, one extremity can also work counterproductively, if the activity of the other extremity predominates. The quantity, which reflects the quantity of the active movement phase, can be determined integrally in relation to both actuating elements or side related, preferably two quantities being determined, which represent the active movement phases of each actuating element separately. By means of the inventive procedure, a training person or an attendant receives data, with which the active cooperation of the training person can be quantified. This enables the training person or the attendant to configure the training in a goal-oriented manner, in order to increase the proportion of the active movement phases.

The essential aspect of a further important solution of a movement device is to be seen therein that the electronic unit is designed so that, when an active effect of an extremity on an actuating element occurs, movement phases of the actuating element, which is acted upon, are defined as a function of fixed criteria as "active phase" and assigned to a first quantity, for example, summed up the first quantity reflecting the active phases, and the remaining movement phases of the actuating element, which is acted upon, are assigned to a second quantity, for example, summed up, the two quantities being comparable. By these means, a side-related evaluation of "active training" and "passive training" can be carried out. By these means, the course of training, for example, of a person paralyzed on one side can be optimized selectively for the diseased leg. For example, when movement phases are assigned to the two quantities, the two movement phases are evaluated with, for example, duration, angle traversed, average performance, average moment and work and this value is added to a value, which corresponds to the applicable quantity with the exception, optionally, of one factor. Comparable quantities are understood to be either standardized quantities or quantities with the same units.

The inventive development can refer to a side-related formation of a quantity, as in the case of the solution described immediately above, or be directed to determining the active phases and an associated quantity on the basis of the sum of an active effect of an extremity pair on the actuating elements. In both cases, it becomes possible in an elegant manner to make available values, which reflect the cooperation in relation to the passivity of the person, to a person, whose movement is impaired. With that, it is more easily possible to determine, by comparison from training session to training session, whether the cooperation of the person being trained has improved or deteriorated. The person being trained can be informed of this already during the training, in order to increase his motivation. By means of these measures, the trainee can also easily follow his physical condition during the training from training unit to training unit by comparing value pairs.

In a particularly preferred development of the invention, the electronic unit is designed for the purpose of defining a movement phase with an active contribution by a training person and with a detectable consequence of the active contribution as active. In this connection, it is preferred in one embodiment of the invention if the electronic unit for fixing the movement phases of the actuating elements, in which the actuating elements move at a higher than specified periodicity, for example, at a higher rpm during a circular movement, is designed as active phases. For example, these active phases are assigned to a first quantity and movement phases of the actuating elements, in which the actuating elements move with the specified periodicity, are assigned to a second quantity. The specified periodicity can also vary within an active phase. Making a division into active and passive training in this way is particularly suitable for movement devices, for which it is possible to adapt an electronic centrifugal mass. Such movement devices permit, for example, a course of motion, for which the legs of a training person are moved with the help of a crank handle at a constant rpm, yet a brief force pulse by the training person causes a large increase in rpm, which then declines comparatively slowly. In this case, it would be disadvantageous for the motivation of the training person if only the brief pulse were to be defined as the active phase and the remaining course of the motion as the passive phase. It is therefore proposed that the whole of the course of the motion, starting from the brief active pulse and continuing until a specified basic rpm is reached once again, be used as active phase.

In a further, particularly advantageous embodiment of the invention, the electronic unit is designed to establish that a given movement phase is active when an active contribution of the training person has occurred within the given movement phase. This measure also is intended to motivate the person in training. For example, the electronic unit evaluates each revolution of the actuating element as if there were an active contribution of the training person. If this is the case, the whole of the revolution is evaluated as an "active phase", even if the active contribution of the person in training occurs only briefly before the conclusion of a complete revolution.

In a particularly preferred development of the invention, the electronic unit is designed so that the movement phases of the actuating elements, in which the respective actuating element is driven by a person in training, in each case is assigned to a first quantity, which reflects the quantity of the driving process and of the movement phases, in which the respective actuating element is braked by a training person, is assigned to a second quantity, which reflects the quantity of the braking process or processes. In other words, the more frequently a movement phase occurs in the course of movements under consideration, in which an actuating element is driven, the larger is, for example, the value of the first quantity in relation to the corresponding actuating element. This represents one possibility of comparing the active and passive phases of the extremities in a side-related manner with one another. Accordingly, for each extremity, such as each foot, for example, the passivity and activity can be made available by a value pair in comparison or by an appropriate ratio of the values. With that, it is possible to compare this value pair or ratio between the feet.

Preferably, the electronic unit should also be designed to produce a single value pair or ratio from these value pairs, which reflects the activity and passivity of an extremity pair in total on the actuating element. In order to realize the extremity-related determination, it is necessary to provide means, by means of which the loading at each actuating element by the respective extremity of the person in training can be determined. This can be accomplished, for example, by applying in each case a force sensor at each actuating element.

In a further particularly preferred embodiment of the invention, the electronic unit is designed for assigning movement phases of the actuating elements, in which the means for driving and braking drive the actuating elements, to a first quantity, which reflects the quantity of the driving process or processes, and movement phases of the actuating elements, in which the means for driving and braking break the actuating element, to a second quantity, which reflects the quantity of the braking process or processes. This procedure describes the possibility of dividing training into active and passive training depending on whether the sum of the actuation of the extremities is active or passive. Such a development can be accomplished relatively easily with a motor driven crank, in that the current supplied to the motor is evaluated.

The various possibilities of assigning active training to a quantity, and optionally passive training to a second quantity can, of course, be integrated into a single electronic unit.

In a simple variation of an embodiment, the value of the first and second quantities can be determined from the duration of the respective movement phase or phases. Likewise, however, it is possible that, in the case of actuating elements capable of rotating, such as a crank, the value of the first and second quantities can be obtained from the angle traversed by the actuating elements in the respective movement phase or phases. It is also possible to integrate driving and braking moments in the respective movement phases over the angle.

In order to provide feedback concerning the course of the training especially to a person in training, it is furthermore proposed that means for displaying the values of the first and second quantities be set in a ratio and/or provided in comparison.

In a further preferred embodiment of the invention, the electronic unit is designed for assigning at least the quantity, which quantifies the active movement phases, preferably this quantity (first quantity) and a second quantity, which reflects the passive phase, on specified training blocks. By these means, warming up and cooling down blocks can be specified, between which the training blocks lie, in which then the first and optionally also the second quantity are determined. Likewise, several "active" training blocks with active and passive movement phases can be separated by relaxation blocks with a strictly passive movement, the first and optionally also the second quantity being determined in relation to all "active" blocks or in relation to only particular "active" blocks. In this connection, it is also preferred if values for the first and optionally also for the second quantity can be ascertained from this for all training blocks under consideration, that is, if an integral determination of the quantities is possible. Furthermore, it is preferred if, in the case of periodically moving actuation elements, the quantity can be determined for a specified path section, such as an angular range of 360° or for several specified path sections.

An example of the invention is shown in the drawing, further advantages and details being explained.

BRIEF DESCRIPTION OF THE DRAWINGS

The FIGURE shows a movement device, the functional units of which are indicated diagrammatically.

DETAILED DESCRIPTION OF THE DRAWINGS

The movement device 1 comprises a crank handle 2 with pedals 3 for the legs of a person in training (not shown), as well as an electric motor 4, which is connected by a V-belt driving mechanism 5 with the shaft 6 of the crank handle 2.

The electric motor 4 is connected over a connection 8 with an electronic unit 7.

The electric unit drives or brakes the motor 4 as a function of a selected movement program.

Moreover, in a specifiable training block, in which the motor is driven, all movement phases are assigned to a first quantity, which reflects the quantity of the driving processes. In the simplest form, the respective duration of the individual movement phases, in which driving is carried out, are added up. In the same way, the movement phases, in which the motor 4 is braked, are assigned to a second quantity, which reproduces the quantity of the braking processes. In the event that the quantity of the driving processes is determined by an addition of time periods, the quantity of braking processes is also determined by a corresponding quantity, so that the two quantities can then be compared with one another. For example, they can be related to one another in a dimension less form.

The two quantities can, as shown in the FIGURE, be represented at a display unit 9.

In this way, a person in training can easily follow whether the ratio of activity to passivity in the training is improving or deteriorating.

What is claimed is:

1. A movement device comprising two mutually connected, movable actuating elements for an extremity pair of a person, means for driving and braking the actuating elements, and an electronic unit for regulating and/or controlling the movement of the actuating elements, wherein the electronic unit is designed so that, when an active effect of an extremity on an actuating element occurs, the electronic unit computes a quantity which, with the exception of optionally one factor, corresponds to a sum of the time intervals, traveled distances or angular distances of active phases of the actuating element.

2. A movement device comprising two mutually connected, movable actuating elements for an extremity pair of a person, means for driving and braking the actuating elements, and an electronic unit for regulating and/or controlling the movement of the actuating elements, wherein the electronic unit is designed so that, when an actuating element is acted upon by an extremity pair in an overall active manner, the electronic unit computes a quantity which, with the exception of optionally one factor, corresponds to a sum of the time intervals, traveled distances or angular distances of active phases of the two actuating elements.

3. The movement device according to claim 1, wherein the electronic unit is designed so that, when an actuating element is acted upon actively by an extremity, the electronic unit computes a first quantity, which corresponds to a sum of the time intervals, traveled distances or angular distances of the active phases of the actuating element, and a second quantity, which corresponds to a sum of the time intervals, traveled distances or angular distances of the non-active phases of the actuating element, wherein the two quantities are compared.

4. The movement device according to claim 1, wherein the electronic unit is designed so that, when an extremity pair acts on the actuating element in an overall active manner, the electronic unit computes a first quantity, which corresponds to a sum of the time intervals, traveled distances or angular distances of the active phases of the actuating element, and a second quantity, which corresponds to a sum of the time intervals, traveled distances or angular distances of the non-active phases of the actuating element, wherein the two quantities are compared.

5. The movement device according to claim 1, wherein the active phases are movement phases of the actuating element with an active contribution by a person in training and with a detectable consequence of the active contribution.

6. The movement device according to claim 5, wherein the active phases are movement phases of the actuating elements, in which the actuating elements move with a periodicity higher than a specified periodicity.

7. The movement device according to claim 1, wherein a specified movement phase is an active phase, if an active contribution of the person in training occurs within the specified movement phase.

8. The movement device according to claim 1, wherein movement phases of the actuating elements, in which the respective actuating element is driven by a person in training, in each case are assigned to a first quantity, which reflects the quantity of the driving process, and movement phases of the actuating elements, in which the respective actuating element is braked by a person in training, in each case are assigned to a second quantity, which reflects the braking process.

9. The movement device according to claim 2, wherein movement phases of the actuating elements, in which the means for driving and braking drives the actuating elements, are assigned to a first quantity, which reflects the quantity of driving process, and movement phases of the actuating elements in which the means for driving and braking brakes the actuating elements, are assigned to a second quantity, which reflects the quantity of the braking process.

10. The movement device according to claim 3, further comprising means for indicating the values of the first and second quantities, placed in a relationship and/or compared.

11. The movement device according to claim 1, wherein the quality is displayed on specified training blocks.

12. The movement device according to claim 2, wherein the electronic unit is designed so that, when an extremity pair acts on the actuating element in an overall active manner, the electronic unit computes a first quantity, which corresponds to a sum of the time intervals, traveled distances or angular distances of the active phases of the actuating element, and a second quantity, which corresponds to a sum of the time intervals, traveled distances or angular distances of the non-active phases of the actuating element, wherein the two quantities are compared.

13. The movement device according to claim 2, wherein the active phases are movement phases of the actuating element with an active contribution by a person in training and with a detectable consequence of the active contribution.

14. The movement device according to claim 3, wherein the active phases are movement phases of the actuating element with an active contribution by a person in training and with a detectable consequence of the active contribution.

15. The movement device according to claim 4, wherein the active phases are movement phases of the actuating element with an active contribution by a person in training and with a detectable consequence of the active contribution.

16. The movement device according to claim 2, wherein a specified movement phase is an active phase, if an active contribution of the person in training occurs within the specified movement phase.

17. The movement device according to claim 3, wherein a specified movement phase is an active phase, if an active contribution of the person in training occurs within the specified movement phase.

18. The movement device according to claim 4, wherein a specified movement phase is an active phase, if an active contribution of the person in training occurs within the specified movement phase.

19. The movement device according to claim 2, wherein movement phases of the actuating elements, in which the respective actuating element is driven by a person in training, in each case are assigned to a first quantity, which reflects the quantity of the driving process, and movement phases of the actuating elements, in which the respective actuating element is braked by a person in training, in each case are assigned to a second quantity, which reflects the braking process.

20. The movement device according to claim 3, wherein movement phases of the actuating elements, in which the respective actuating element is driven by a person in training, in each case are assigned to a first quantity, which reflects the quantity of the driving process, and movement phases of the actuating elements, in which the respective actuating element is braked by a person in training, in each case are assigned to a second quantity, which reflects the braking process.

21. The movement device according to claim 3, wherein movement phases of the actuating elements, in which the means for driving and braking drives the actuating elements, are assigned to a first quantity, which reflects the quantity of driving process, and movement phases of the actuating elements in which the means for driving and braking brakes the actuating elements, are assigned to a second quantity, which reflects the quantity of the braking process.

22. The movement device according to claim 4, wherein movement phases of the actuating elements, in which the means for driving and braking drives the actuating elements, are assigned to a first quantity, which reflects the quantity of driving process, and movement phases of the actuating elements in which the means for driving and braking brakes the actuating elements, are assigned to a second quantity, which reflects the quantity of the braking process.

23. A movement device comprising two mutually connected, movable actuating elements for an extremity pair of a person, means for driving and braking the actuating elements, and an electronic unit for regulating and/or controlling the movement of the actuating elements, wherein the electronic unit is designed so that, when an actuating element is acted upon actively by an extremity, the electronic unit computes a first quantity, which corresponds to a sum of the time intervals, traveled distances or angular distances of the active phases of the actuating element, and a second quantity, which corresponds to a sum of the time intervals, traveled distances or angular distances of the non-active phases of the actuating element, wherein the two quantities are compared.

24. The movement device according to claim 23, wherein the active phases are movement phases of the actuating element with an active contribution by a person in training and with a detectable consequence of the active contribution.

25. The movement device according to claim 24, wherein the active phases are movement phases of the actuating elements, in which the actuating elements move with a periodicity higher than a specified periodicity.

26. The movement device according to claim 23, wherein a specified movement phase is an active phase, if an active contribution of the person in training occurs within the specified movement phase.

27. A movement device comprising two mutually connected, movable actuating elements for an extremity pair of a person, means for driving and braking the actuating elements, and an electronic unit for regulating and/or controlling the movement of the actuating elements, wherein the electronic unit is designed so that, when an extremity pair acts on the actuating element in an overall active manner, the electronic unit computes a first quantity, which corresponds to a sum of the time intervals, traveled distances or angular distances of the active phases of the actuating element, and a second quantity, which corresponds to a sum of the time intervals, traveled distances or angular distances of the non-active phases of the actuating element, wherein the two quantities are compared.

28. The movement device according to claim 27, wherein the active phases are movement phases of the actuating element with an active contribution by a person in training and with a detectable consequence of the active contribution.

29. The movement device according to claim 28, wherein the active phases are movement phases of the actuating elements, in which the actuating elements move with a periodicity higher than a specified periodicity.

30. The movement device according to claim 27, wherein a specified movement phase is an active phase, if an active contribution of the person in training occurs within the specified movement phase.

* * * * *